US005365639A

United States Patent [19]

Lewkoski

[11] Patent Number: 5,365,639

[45] Date of Patent: Nov. 22, 1994

[54] BALL AND SOCKET HINGE ASSEMBLY WITH TRANSLATABLE SCREW

[75] Inventor: Randolph D. Lewkoski, Penetanguishene, Canada

[73] Assignee: Techform Products Limited, Ontario, Canada

[21] Appl. No.: 957,679

[22] Filed: Oct. 7, 1992

[51] Int. Cl.[5] ........ B62D 25/12

[52] U.S. Cl. ........ 16/224; 16/245; 296/76

[58] Field of Search ........ 16/224, 245; 296/76

[56] References Cited

U.S. PATENT DOCUMENTS

| | | | |
|---|---|---|---|
| 2,050,469 | 8/1936 | Smith . | |
| 2,153,541 | 4/1939 | Atwood . | |
| 2,200,312 | 5/1940 | Voorhees . | |
| 2,200,439 | 5/1940 | Atwood . | |
| 2,200,441 | 5/1940 | Atwood . | |
| 2,632,917 | 3/1953 | Schwering . | |
| 2,714,835 | 8/1955 | Ogle, Jr. . | |
| 3,095,600 | 7/1963 | Bretzner . | |
| 3,406,483 | 10/1968 | Mitchell . | |
| 3,685,095 | 8/1972 | Goossev | 16/224 |
| 3,714,678 | 2/1973 | Weisz et al. | 16/224 |
| 4,893,863 | 1/1990 | Skonieczny et al. | 16/245 |
| 5,074,609 | 12/1991 | Dear | 16/245 |

FOREIGN PATENT DOCUMENTS

| | | | |
|---|---|---|---|
| 951 | 1/1982 | Japan | 296/76 |
| 141373 | 5/1990 | Japan | 296/76 |
| 144263 | 6/1990 | Japan | 296/76 |
| 14485 | 11/1990 | WIPO | 16/224 |

*Primary Examiner*—James F. Coan

*Attorney, Agent, or Firm*—Brooks & Kushman

[57] ABSTRACT

A hinge assembly (22) for mounting a deck lid (24) to a vehicle body (28) is disclosed. The hinge assembly (22) comprises a mount (36), an elongate strap (38) and a swivel (44) for swivelably attaching the strap (38) to the mount (36). The swivel (44) is preferably a ball which cooperates with a socket. Ideally, the hinge assembly (22) includes a translatable screw or rod (45) which provides for height adjustment of a deck lid (24) with respect to a vehicle body (28).

12 Claims, 3 Drawing Sheets

BALL AND SOCKET HINGE ASSEMBLY WITH TRANSLATABLE SCREW

TECHNICAL FIELD

This invention relates to hinge assemblies for mounting deck lids to vehicle bodies.

BACKGROUND ART

Deck lids or trunks are conventionally pivotally mounted to vehicle bodies using a pair of hinge assemblies each of which has a cylindrical pivot pin aligned along a horizontal coaxial axis. Each of these hinge assemblies also includes a mounting plate, which is mountable to a back shelf of a vehicle body, a pair of spaced flanges which are attached to the mounting plate and which support a hinge pin therebetween, and an elongate strap. Each elongate strap is connected between a hinge pin and the deck lid so that the deck lid may pivot vertically about the horizontal coaxial axis.

A deck lid may be attached to a vehicle body in a couple of different ways. First, the hinge assemblies, including straps, may be bolted or welded to the back shelf of the vehicle body. Then, a deck lid is placed adjacent each of the straps of the hinge assemblies and the straps are affixed to the deck lid.

Alternatively, the pair of the hinge assemblies may be first attached to the deck lid. Then, the mounting plates of the hinge assemblies are affixed to the back shelf of the vehicle body.

Use of hinge assemblies, as described above, to join a deck lid to a vehicle body has several shortcomings. First, "torque problems" may exist due to misalignment between the straps and the deck lid during their attachment. For example, there is the case where the hinge assemblies are affixed to the vehicle body prior to being joined to the deck lid. If planar mating surfaces on the deck lid and the straps are not perfectly flush and aligned, bolting and twisting of these surfaces flush together will cause deformation and torque to be created across the deck lid and the strap.

If this torque is sufficient, undesirable distortion or bow may be formed on the skin of the deck lid. Also, the torque created in a strap is transferred to the respective hinge pin of the hinge assembly and the back shelf of the vehicle body. Forces are transferred across spaced apart bolted or welded connections between the mounting plate and the back shelf due to the torque applied from the strap. To keep these forces small relative to the torque applied, large moment arms are required between the bolted or welded connections. Accordingly, the mounting plates must be sized to keep the moment arms large and the forces small.

Alternatively, there is the case where each of the straps is secured to the deck lid prior to the attachment of the mounting plates to the back shelf. Here, the straps and the rest of the hinge assemblies may be freely rotated during attachment to the deck lid. During mounting of the hinge assembly to the vehicle body, rotation or twisting of the hinge assembly may be necessary if the mounting plate is not flushly aligned with the back shelf of the vehicle body. Consequently, torque must be applied to the mounting plates to place the mounting plate in position for welding or else for the tightening of bolted connections. Again, this results in a torque developing across the mounting plate, the hinge pins, the back shelf, the straps and the deck lid.

Accordingly, as torque is transferred across the hinge pins, the hinge pins are subject to wear when they rotate relative their supports. Also, the necessity of applying torque to components during the mounting of a deck lid to a vehicle body increases the difficulty of completing this task.

Another problem associated with using the aforementioned hinge assemblies with hinge pins is that straps are not readily vertically adjustable relative to their mounting plates. When the deck lid is in a closed position, the edges of the deck lid should be even in height with the adjacent edges and surfaces on the vehicle body to form a smooth, aesthetically pleasing continuous surface on the vehicle. Mismatches in height may result from manufacturing defects or from tolerance build-ups in the assembly of the deck lid, hinge box, strap, and vehicle body.

One method of remedying this height mismatch is to place a piece of wood over the deck lid and pound the piece of wood with a hammer to deform the supporting strap and deck lid sufficiently such that the height mismatches are reduced.

The present invention addresses the aforementioned shortcomings associated with mounting deck lids to vehicle bodies using conventional hinge assemblies with hinge pins.

SUMMARY OF THE INVENTION

The present invention includes a hinge assembly for mounting a deck lid to a vehicle body so that the deck lid may pivot about a hinge axis. The hinge assembly comprises a mount securable to the vehicle body, an elongate strap affixable to the deck lid and having a longitudinal axis extending through the strap, and swivel means for swivelably attaching the strap to the mount. The swivel means attaches the strap to the mount and allows the strap to rotate about its longitudinal axis relative to the mount during the mounting of the deck lid to the vehicle and permits the deck lid to pivot about the hinge axis when the deck lid is mounted to the vehicle body.

Preferably, the mount includes a socket and the swivel means is a generally spherical ball swivelably retained within the socket. Also, ideally the hinge assembly includes an elongated rod which is adjustably connected to at least one of the ball or the strap so that the distance between the ball and the strap may be varied. This allows the deck lid to be translatably adjusted relative to the vehicle body.

According to another aspect of the present invention, a method for mounting a deck lid to a vehicle body is provided. The method comprises the steps of swivelably connecting a strap to a mount, affixing the strap to the deck lid and securing the mount to the vehicle body. Preferably, the step of swivelably connecting the strap to the mount includes swivelably retaining a ball within a socket, the ball attaching to one of the strap or the mount and the socket being affixed to the other of the strap or the mount.

The present invention also includes a hinge assembly for mounting a deck lid to a vehicle body which comprises an elongate strap affixable to the deck lid, a mount adapted to be secured to the vehicle body and means for adjustably connecting the strap to the mount so that when the strap is connected to the deck lid and the mount is secured to the vehicle body, the deck lid can be translatably adjusted relative to the vehicle body.

It is an object of the present invention to provide a hinge assembly for mounting a deck lid to a vehicle body, the hinge assembly having a strap which is swivelably attached to a mount thereby allowing the strap to rotate about its longitudinal axis with respect to the mount.

It is another object to provide a hinge assembly which has a translatable screw or rod which provides for adjustability in height between a vehicle body and a deck lid mounting thereon.

It is a further object to provide a hinge assembly for mounting a deck lid to a vehicle body which has a mounting assembly which is smaller, has fewer components, and is easier and cheaper to manufacture than that of conventional hinge assemblies having hinge pins.

Still a further object is to provide a hinge assembly mounting between a deck lid and the vehicle body which has strap swivelably attached to a mount which inhibits the transfer of torque from the strap to the mount.

Still another object is to provide a combination of a deck lid and pair of hinge assemblies, each hinge assembly having a ball and socket joint, which provides for the adjustability of the height of a deck lid relative to vehicle body.

Another object is to provide a method for mounting a deck lid to a vehicle body including the following steps. A strap is swivelably connected to a mount. The strap is affixed to the deck lid. The mount is secured to the vehicle body. Preferably, the strap is swivelably connected to the mount using a ball and socket joint. Preferably, an elongated threaded rod cooperates with the ball and the strap to provide translatable adjustment between the strap and the mount.

Other objects, features and advantages will become more readily apparent from the following description and accompanying sheet of drawings.

BEST MODE FOR CARRYING OUT THE INVENTION

Figure 1:
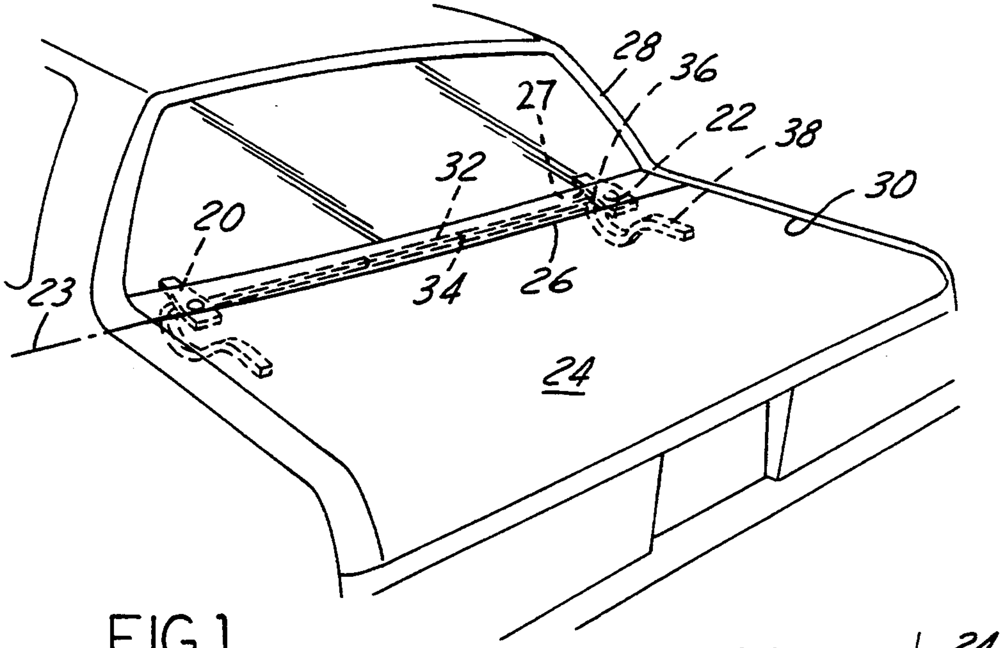
FIG. 1 is a fragmentary perspective view of a vehicle body having a pair of hinge assemblies, made in accordance with the present invention, mounting a deck lid to the vehicle body.

A pair of hinge assemblies 20 and 22, made in accordance with the present invention, is shown in FIG. 1 mounting a deck lid 24 to the back shelf 26 of a vehicle body 28. A horizontal hinge axis 23 extends laterally and horizontally through hinge assemblies 20 and 22. Deck lid 24 pivots vertically about pivot axis 23 between a closed position and an open position. Deck lid 24 is shown in the closed position relative to a deck lid opening 30 formed in vehicle body 28. A pair of hidden torsion bars 32 and 34, shown in phantom lines, extend laterally between the respective hinge assemblies 20 and 22 to bias deck lid 24 toward the open position.

Each of hinge assemblies 20 and 22 are generally identical. Therefore, like features on each of hinge assemblies 20 and 22 will be identified with like reference numerals. For brevity, only hinge assembly 22 will be described in detail.

Figure 2:
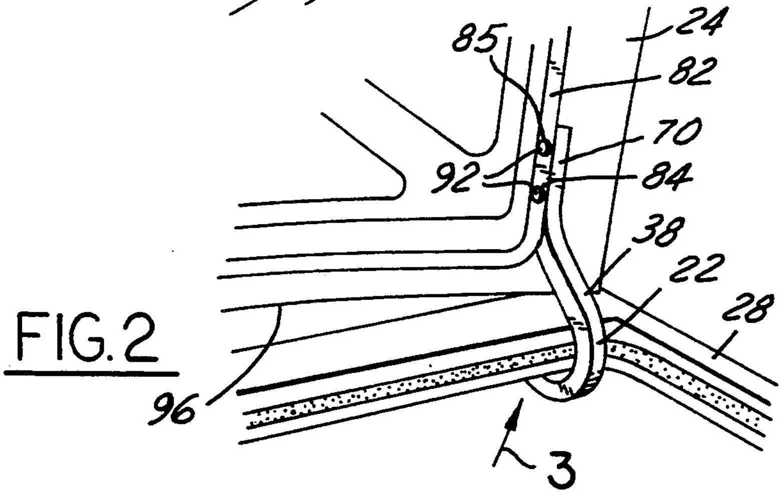
FIG. 2 is a fragmentary perspective view of a strap connecting to a deck lid.
Figure 3:
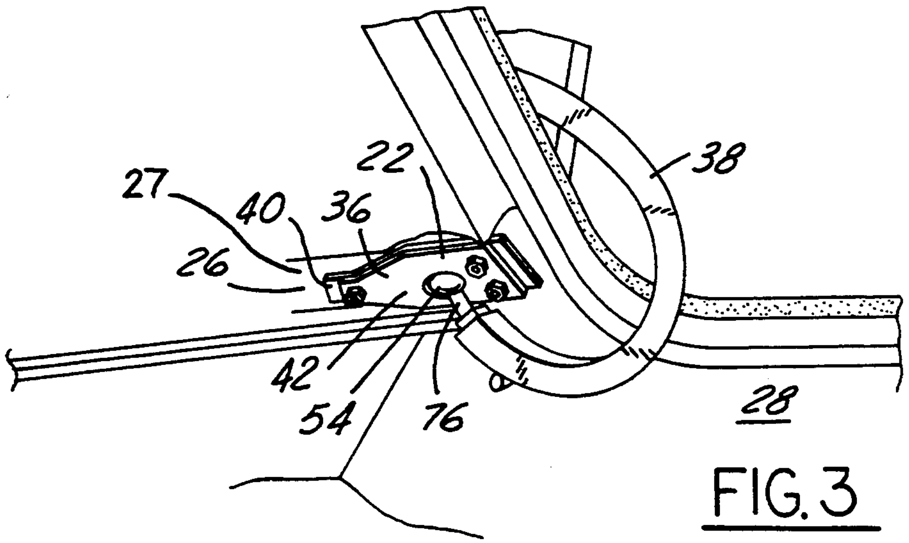
FIG. 3 is a fragmentary perspective view, taken along arrow 3 of FIG. 2, showing a hinge assembly mounting to a vehicle body.

FIG. 2 shows a portion of deck lid 24 being pivotally attached by hinge assembly 22 to vehicle body 28 in an open position. FIG. 3 depicts a view, looking along arrow 3 of FIG. 2, from the inside of the vehicle trunk showing hinge assembly 22 mounting to back shelf 26 of vehicle body 28. Hinge assembly 22 mounts flushly to a mounting surface 27 of back shelf 26.

Figure 4:
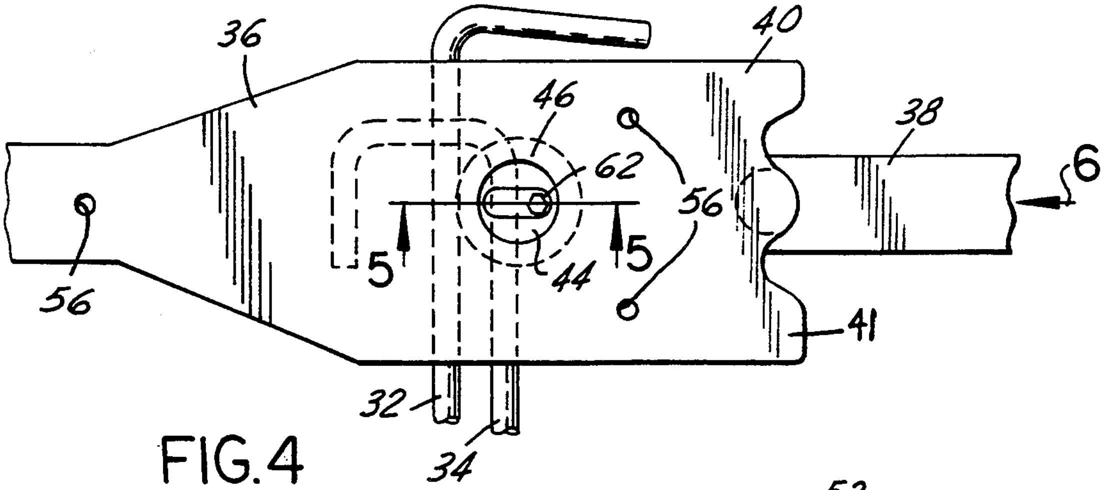
FIG. 4 is a fragmentary top view of the hinge assembly.
Figure 5:
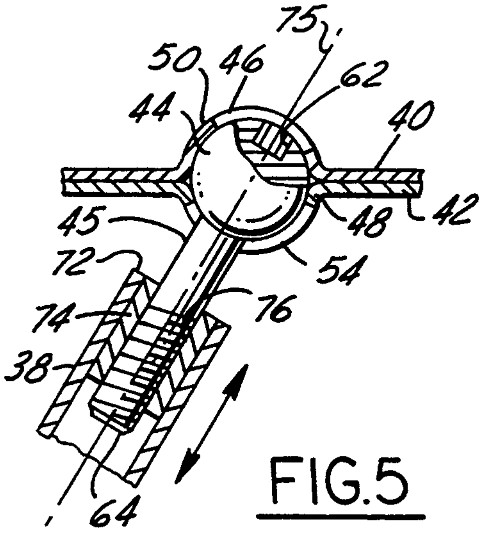
FIG. 5 is a fragmentary sectional view taken along line 5—5 of FIG. 4.
Figure 6:
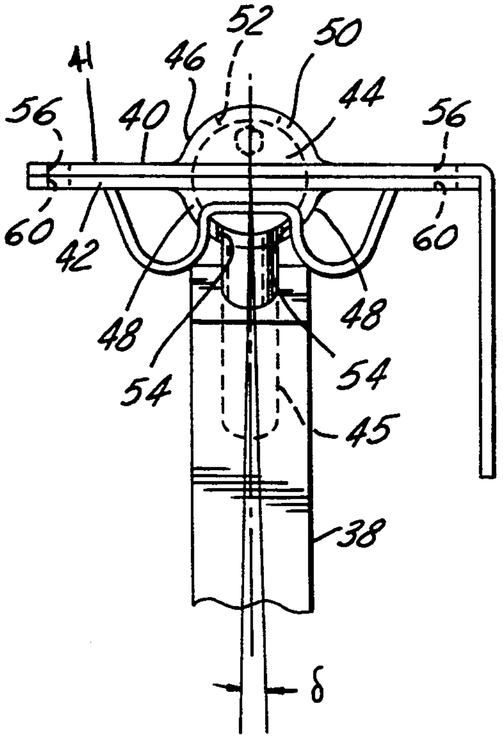
FIG. 6 is a fragmentary rear elevational view taken along arrow 6 of FIG. 4.

Turning now to FIGS. 4, 5 and 6, hinge assembly 22 comprises a hinge box 36 and strap 38. Hinge box 36 includes a top plate 40, a bottom plate 42 and a ball 44 swivelably retained between plates 42 and 44. Top plate 40 has a mounting surface 41 which is mountable against mounting surface 27 of back shelf 26. Attached to ball 44 is an elongated shaft 45. Top plate 40 and bottom plate 42 have respective top and bottom hemi-spherical socket portions 46 and 48 which combine to form socket 50 and to swivelably capture ball 44. Ball 44 is sized to fit snugly within socket 50 so as to prevent rattling therebetween while allowing for the free swiveling of ball 44 within socket 50.

Socket portion 46 has a ball access aperture 52 which provides access to the top half of ball 44. Likewise, socket portion 48 has an arcuate rod access slot 54 through which elongated rod 45 extends. Slot 54 is slightly wider than elongated slot 54 to allow for limited lateral movement therebetween. Both ball access aperture 52 and rod access slot 54 are aligned along a vertical plane extending through ball 44. Three spaced apart holes 56 and 60 are formed in respective top and bottom plates 40 and 42 and are, respectively, coaxially aligned.

Ball 44 has a hexagonal shaped socket 62 formed in its top half which is adapted to receive a hexagonal Allen wrench. Elongated rod 45 has a threaded free end 64 spaced from ball 44.

Looking now to FIGS. 5 and 7–9, strap 38 is shown attaching to elongated rod 45 of hinge box 36. Strap 38 is a hollow box section in cross-section and includes a U-shaped portion 66 connecting between a distal portion 70 and a proximate portion 72. As shown in phantom, U-shaped portion 66 is configured to accommodate the rear edge of deck lid opening 30 when strap 38 is in a fully open position. Proximate portion 72 is located adjacent hinge box 36. An insert 74 is either press-fit or welded into proximate end 72 and has a threaded aperture 76.

Threaded aperture 76 is adapted to receive threaded end 64 of elongated rod 45. The threads on threaded end 64 of elongated rod 45 are slightly mismatched relative to the threads on aperture 76. There exists enough interference fit between the mating threads such that threaded end 64 will not vibrate and rotate relative to aperture 76 during vehicle operation. A longitudinal axis 75 is coaxial with proximate portion 72 and a longitudinal axis 77 is coaxial with distal portion 70 of strap 38.

Figures 7, 8, 9:
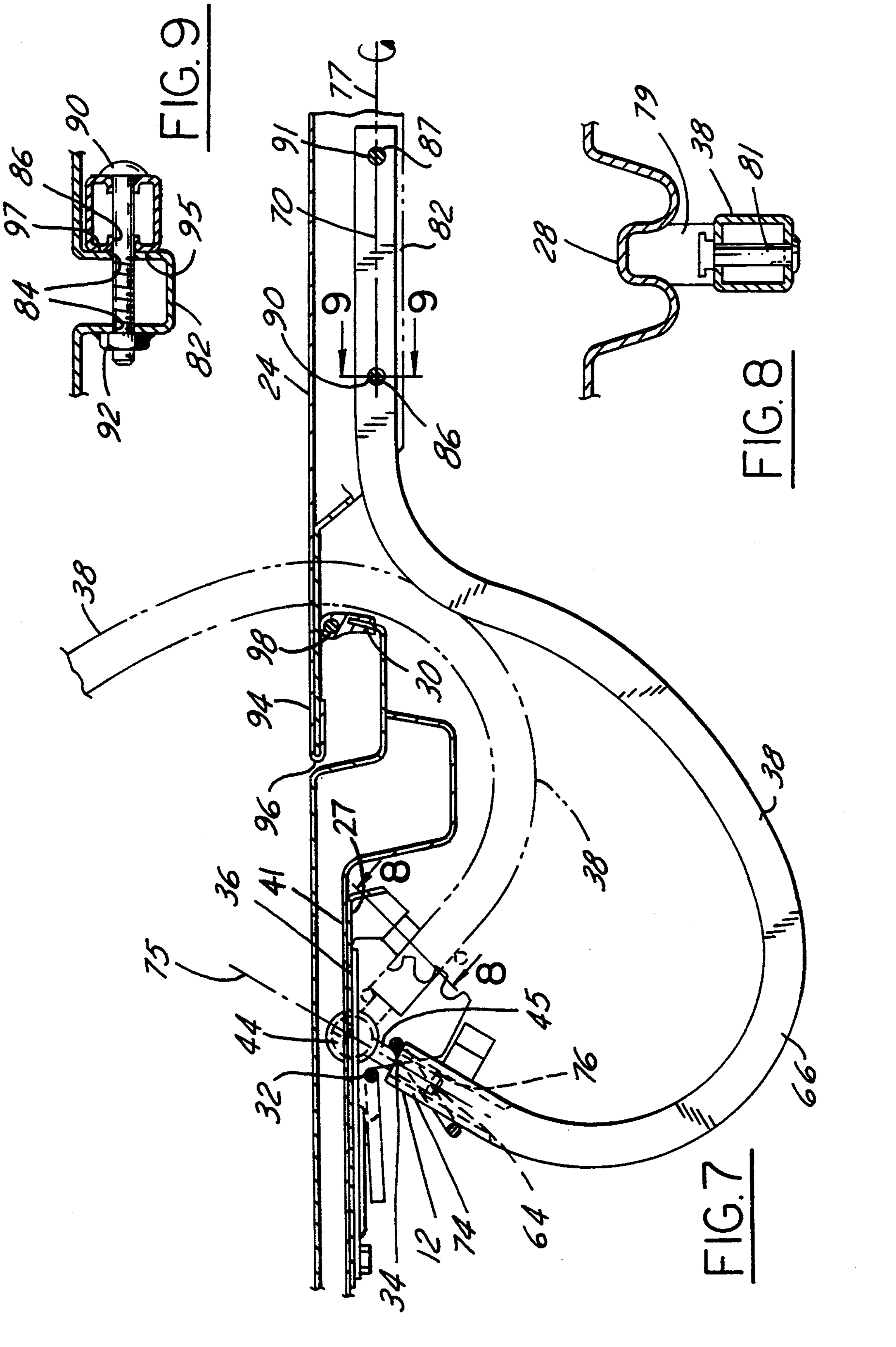
FIG. 7 is a fragmentary side elevational view of a hinge assembly mounting to the back shelf of a vehicle body, the strap being shown in a closed position, and in phantom lines, in an open position.
FIG. 8 is a sectional view, taken along line 8—8 of FIG. 7, showing a bumper mounted to a strap.
FIG. 9 is a sectional view, taken along line 9—9 of FIG. 7, showing a strap attaching to a rib of a deck lid.

FIG. 8 shows a rubber bumper 79 which is affixed by a rivet 81 atop proximate portion 72 of strap 38. In the fully open position of deck lid 24, bumper 79 engages a portion of vehicle body 28 to prevent the banging of strap 38 on vehicle body 28.

Hinge box 36 is joined to strap 38 by threadedly engaging threaded end 64 of elongated rod 45 within threaded aperture 76 of insert 74. The arrow in FIG. 5 indicates that the distance between the end of the proximate portion of 72 of strap 38 and ball 44 of hinge box 36 can be axially adjusted along axis 75 by threadedly rotating ball 44 and elongated rod 45 relative to threaded aperture 76 of insert 74.

The lateral width of rod access slot 54 is slightly wider than the diameter of elongated rod 45. This allows elongated rod 45 to move laterally side-to-side and strap 38 to rotate about longitudinal axis 77 which passes through its distal portion 70. Enlarging the width of slot 54 will provide for greater rotation of strap 38 about axis 77 by allowing greater side-to-side movement of elongated rod 45 within slot 54, as can be appreciated from the configuration of strap 38 and hinge box 36 in FIG. 7.

Looking to FIGS. 2, 7 and 9, deck lid 24 is secured at a couple of location to the distal portion 70 of the strap 38. On the underside of deck lid 24 is a longitudinally extending U-shaped rib 82 which has two pair of longitudinally spaced apertures 84 and 85. Distal portion 70 of strap 38 has two pair of longitudinally spaced apertures 86 and 87 which are coaxially alignable with respective apertures 84 and 85 of rib 82. A pair of bolts 90 and 91 extend through respective apertures 84 and 86, and 85 and 87. Threaded nuts 92 and 93 are affixed to rib 82 and threadedly receive respective bolts 90 and 91 thereby clampingly retaining strap 38 to rib 82 of deck lid 24.

Note that the clamping of strap 38 to rib 82 results in respective juxtaposed vertical mounting surfaces 95 and 97 of strap 38 and rib 82 being rotated into flush planar contact. To the degree that elongated rod 45 is free to move laterally within slot 54, strap 38 is able to freely rotate about axis 77 to accommodate any relative rotational mismatch between a vertical mounting surface 95 on strap 38 and vertical mounting surface 97 on rib 82. Rotating strap 38 about axis 77, until elongated rod 45 bears upon slot 54, will not result in any torque or twisting forces being developed along strap 38 even when hinge box 36 is affixed to back shelf 26. Accordingly, a smaller hinge box 36 may be used with the present invention as compared to a conventional hinge assembly which transfers torque to the vehicle body through a hinge pin.

Looking again to FIG. 7, deck lid 24 has a front portion 94 which has a laterally extending front edge 96. Front portion 94 sealingly mates with a seal 98 when strap 38 and deck lid 24 are in a closed position.

The vertical height of the front edge 96 of deck lid 24 is dependent upon the relative axial distance between ball 44 and the end of proximate portion 72 of strap 38. By rotating ball 44 relative to insert 74, the height of front edge 96 can be adjusted to achieve a smooth flush horizontal surface between deck lid 24 and the adjacent surfaces of deck lid opening 30. This obviates the need to deform strap 38 and deck lid 24 to achieve this flush condition as has been done in the past using previous hinge assembly designs.

The pair of torsion bars 32 and 34 extend between hinge assemblies 20 and 22. Each of hinge assemblies 22 and 24 have a vertically extending retaining flange 104 which has notches 108. The ends of torsion bars 32 and 34 are held in notches 108 and function in a conventional manner to bias deck lid 24 into the open position. A locking mechanism, not shown, is located at the rear of deck lid 24 to lock deck 24 to vehicle body 28 in a closed position.

In operation, ball 44 is placed between socket portion 46 of top plate 40 and socket portion 48 of bottom plate 42 with elongated rod 45 extending through slot 54. Plates 40 and 42 are then welded together forming socket 50 swivelably securing ball 44 therebetween. Next, threaded end 64 is threaded into threaded aperture 76 to connect strap 38 to hinge box 36.

A hexagonal Allen wrench is inserted through ball access aperture 52 and into hexagonal socket 62 and rotated to axial adjust the height of deck lid 24 relative to vehicle body 28 to provide for the rotation of ball 44.

Hinge box 36 is then positioned beneath back shelf 26 of vehicle body 28. Bolted connections (not shown) are formed across mounting holes 56 and 60 of top and bottom plates 40 and 42 and longitudinally extending elongated slots (not shown) in back shelf 26 to secure hinge box 36 to vehicle body 28. As can be seen in FIG. 7, mounting surfaces 27 and 41 are in flush engagement with one another.

This procedure is repeated again with hinge assembly 20. This results in straps 38 of hinge assemblies 20 and 22 extending longitudinally rearwardly from back shelf 26.

Deck lid 24 is then positioned adjacent each of straps 38. Respective bolts 90 and 91 are inserted through apertures 84 and 85 of ribs 82 and apertures 86 and 87 of straps 38 and retained within fixed nuts 92 and 93. The tightening of bolts 90 and 91 within nuts 92 and 93 results in planar mounting surfaces 95 and 97 being brought into flush, planar contact. Any resulting rotation of straps 38 about axis 77, within limits established by the width of slots 54, is accommodated by the swiveling of ball 44 within socket 50 of hinge box 36. Therefore, no twisting forces or torques are created due to the affixing of strap 38 to deck lid 24 during the mounting of deck lid 24 to vehicle body 28.

Deck lid 24 is then placed in a closed position with deck lid 24 locking to vehicle body 28 by the conventional locking mechanism located at the rear of deck lid 24 and vehicle body 28. Each of balls 44 are then rotated by an Allen wrench to adjust the axial spacings between balls 44 and the respective ends of proximate portions 72 of straps 38 so that the surface on deck lid 24 is flush with the surrounding deck lid opening 30. Also, hinge boxes 36 may be longitudinally adjusted relative to the slots in back shelf 26 of vehicle body 28 to appropriately longitudinally adjust deck lid 24 within deck lid opening 30.

Hinge assemblies 20 and 22 cooperate to mount deck lid 24 to vehicle body 28 as deck lid 24 pivots about hinge axis 23. Laterally movement of deck lid 24 is prevented by the bearing of elongated rods 45 against rod access slots 54 of socket portions 48. The affixing of straps 38 to deck lid 24 forms a rigid frame. The attachment of hinge boxes 36 to back shelf 26 at two spaced apart horizontal points then prevents significant lateral movement of deck lid 24 relative to deck lid opening 30.

While this invention has been described in the foregoing specification in relation to certain preferred embodiments thereof, and many details have been set forth for the purposes of illustration, it will become apparent to those skilled in the art that the invention is susceptible to additional embodiments and that certain details described herein can be varied considerably without departing from the basic principles of the invention.

For example, deck lid 24 may first be attached to straps 38. Hinge assemblies 20 and 22 may then be attached to vehicle body 28. Balls 44 may swivel within sockets 50 to accommodate misalignment between the straps 38 and top and bottom plates 40 and 42.

What is claimed is:

1. A first hinge assembly for mounting, in cooperation with a second hinge assembly, a deck lid to a vehicle body so that the deck lid may pivot about a hinge axis extending between the hinge assemblies, the deck lid and vehicle body each having mounting surfaces, the first hinge assembly comprising:

a mount having a mounting surface engageable with the mounting surface of the vehicle body; and an elongate strap having a mounting surface engageable with the mounting surface of the deck lid the mount and the strap having a ball and socket joint formed therebetween for swivelably attaching the strap to the mount so that the strap may rotate relative to the mount about a second axis extending substantially perpendicular to the hinge axis;

whereby the ball and socket joint attaches the strap to the mount and allows the strap to rotate about the second axis relative to the mount during the mounting of the deck lid to the vehicle so that the respective mounting surfaces on the vehicle body and the mount and the mounting surfaces on the strap and the deck lid can flushly mount to one another without having to apply a force deforming the first mounting assembly to bring the respective mounting surfaces into flush engagement.

2. The hinge assembly of claim 1 wherein:

the mount includes a socket and the ball is attached to the strap and is swivelably retained within the socket.

3. The hinge assembly of claim 2 wherein:

the mount includes a top plate and a bottom plate, each plate having a socket portion formed therein which cooperates with the other socket portion to form the socket swivelably retaining the ball.

4. The hinge assembly of claim 2 further comprising:

an elongated rod which connects the ball to the strap.

5. The hinge assembly of claim 4 wherein:

the elongated rod is adjustably connected to at least one of the ball or the strap so that the distance between the ball and the strap may be varied to adjust the positioning of the deck lid relative to the vehicle body.

6. The hinge assembly of claim 5 wherein:

the elongated rod has at least one end which is threadedly engaged with at least one of the ball or the strap to provide for an adjustable connection between the elongated rod and at least one of the ball and the strap.

7. The hinge assembly of claim 6 wherein:

the ball has a torque receiving means for receiving torque which rotates the ball within the socket.

8. The hinge assembly of claim 7 wherein:

the torque receiving means is a non-circular aperture.

9. The hinge assembly of claim 4 wherein:

the socket has a elongate slot which extends in a plane perpendicular to the hinge axis and which cooperates with the elongate rod to allow the deck lid to pivot about the hinge axis.

10. The hinge assembly of claim 9 wherein:

the elongate slot is wider than the elongated rod thereby allowing side-to-side movement of the elongated rod within slot and allowing rotation of the strap about its longitudinal axis.

11. A method for mounting a deck lid to a vehicle body comprising the steps of:

swivelably connecting an elongate strap to a mount using a ball and socket joint to provide a plurality of rotational degrees of freedom of movement of the strap relative to the mount;

orientating mounting surfaces on the strap and the deck lid in flush engagement with one another and affixing the strap to the deck lid; and positioning mounting surfaces on the mount and vehicle body in flush engagement with one another and securing the mount to the vehicle body;

whereby the ball and socket joint permits the deck lid to pivot about a hinge axis to open and close the deck lid with respect to the vehicle body and permits the strap to rotate relative to the mount about a second axis extending substantially perpendicular to the hinge axis so that no force need be applied to deform the strap or mount to effect the flush engagement between the mounting surfaces on the body and the mount or between the mounting surfaces on the strap and the deck lid during mounting of the deck lid on the vehicle body.

12. The method of claim 11 wherein:

the step of swivelably connecting a strap to a mount includes providing means for adjusting the distance between the mount and the strap.

* * * * *

UNITED STATES PATENT AND TRADEMARK OFFICE

CERTIFICATE OF CORRECTION

PATENT NO. : 5,365,639

DATED : November 22, 1994

INVENTOR(S) : Randolph D. Lewkoski

It is certified that error appears in the above-indentified patent and that said Letters Patent is hereby corrected as shown below:

Column 7, line 36, delete "mounting" and insert --hinge--.

Signed and Sealed this

Ninth Day of May, 1995

Attest:

BRUCE LEHMAN

*Attesting Officer* *Commissioner of Patents and Trademarks*